(12) United States Patent
Kobayashi

(10) Patent No.: US 9,269,192 B2
(45) Date of Patent: Feb. 23, 2016

(54) HEAD-MOUNTED DISPLAY DEVICE

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 377 days.

(21) Appl. No.: 13/787,443

(22) Filed: Mar. 6, 2013

(65) Prior Publication Data
US 2013/0249945 A1   Sep. 26, 2013

(30) Foreign Application Priority Data

Mar. 26, 2012 (JP) ................. 2012-068767

(51) Int. Cl.
*G09G 5/00* (2006.01)
*G06T 19/00* (2011.01)
*G02B 27/01* (2006.01)

(52) U.S. Cl.
CPC ............ *G06T 19/006* (2013.01); *G02B 27/017* (2013.01); *G02B 27/0172* (2013.01); *G02B 2027/0178* (2013.01)

(58) Field of Classification Search
CPC ............ G02B 27/017; G02B 27/0172; G02B 2027/0178; G06T 19/006
USPC ............ 345/7–9, 632, 633; 348/51, 564, 569
See application file for complete search history.

(56) References Cited

U.S. PATENT DOCUMENTS

| | | | |
|---|---|---|---|
| 7,719,769 B2 * | 5/2010 | Sugihara et al. | 359/630 |
| 7,944,616 B2 * | 5/2011 | Mukawa | 359/630 |
| 8,045,825 B2 * | 10/2011 | Shimoyama et al. | 382/284 |
| 8,556,414 B2 * | 10/2013 | Yoshida | 351/137 |
| 2003/0020707 A1 * | 1/2003 | Kangas et al. | 345/418 |
| 2007/0058261 A1 | 3/2007 | Sugihara et al. | |
| 2011/0234386 A1 * | 9/2011 | Matsuda | 340/12.54 |
| 2011/0310491 A1 | 12/2011 | Takagi et al. | |
| 2012/0200935 A1 * | 8/2012 | Miyao et al. | 359/630 |
| 2013/0162673 A1 * | 6/2013 | Bohn | 345/633 |

FOREIGN PATENT DOCUMENTS

| | | |
|---|---|---|
| JP | 2005-148655 A | 6/2005 |
| JP | 2006-3879 A | 1/2006 |
| JP | 2011-076503 A | 4/2011 |
| JP | 2012-003040 A | 1/2012 |

* cited by examiner

*Primary Examiner* — Jimmy H Nguyen
(74) *Attorney, Agent, or Firm* — ALG Intellectual Property, LLC

(57) ABSTRACT

A head-mounted display device that allows a user to visually recognize a virtual image in a state where the head-mounted display device is mounted on the head of the user, including: an image processing unit that performs a process of generating an image; and an image display unit having an image light generating unit that generates image light representing the image, and configured such that the user can visually recognize the virtual image and the outside world, wherein the head-mounted display device is configured such that in a partial area of an area where the virtual image can be displayed in a visual field of the user, the outside world can be visually recognized preferentially.

8 Claims, 13 Drawing Sheets

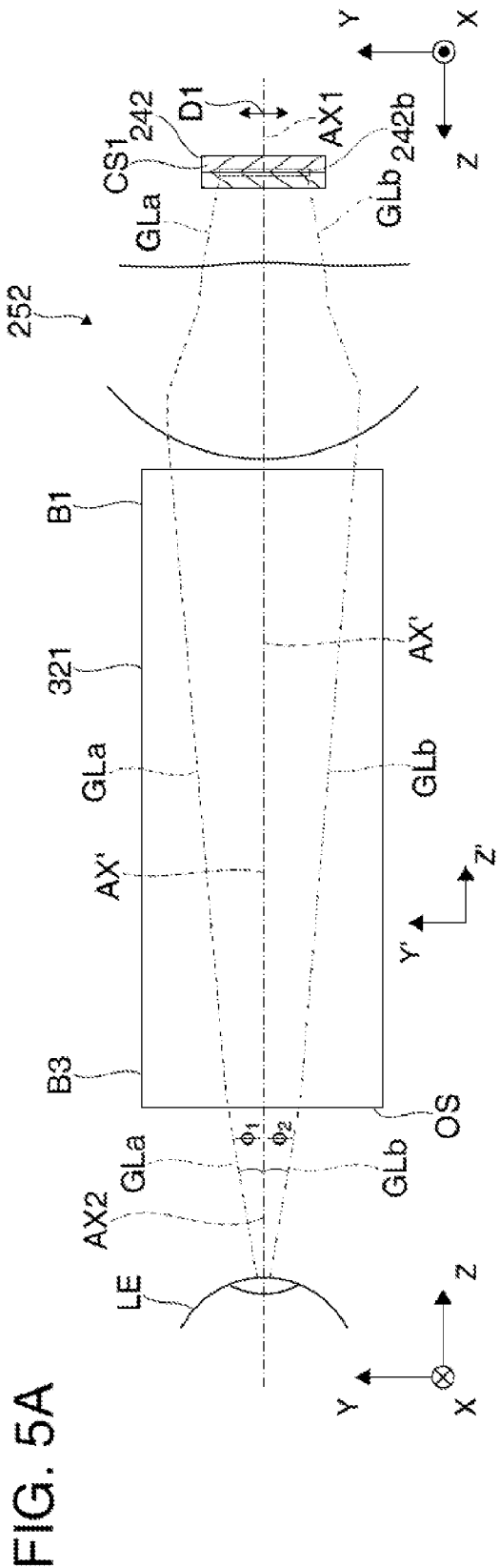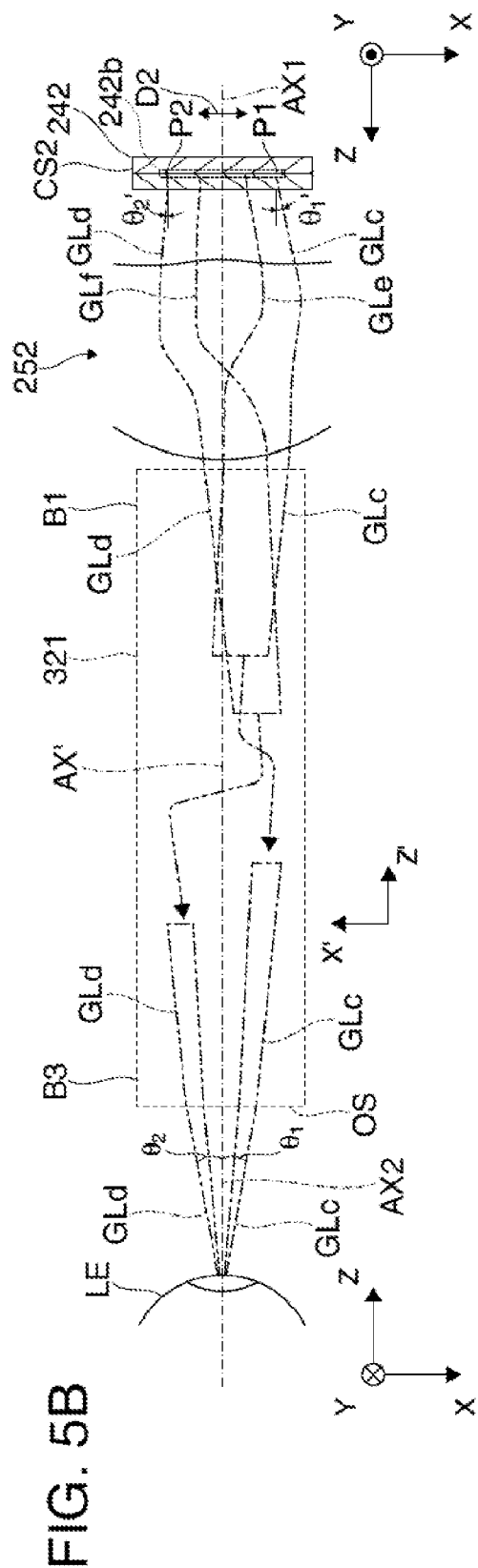

HEAD-MOUNTED DISPLAY DEVICE

BACKGROUND

1. Technical Field

The present invention relates to a head-mounted display device that allows a user to visually recognize a virtual image in a state where the head-mounted display device is mounted on the head of the user.

2. Related Art

In the related art, head-mounted display devices that allow a user to visually recognize a virtual image in a state where the head-mounted display device is mounted on the head of the user, like head-mounted displays, have been known. In such head-mounted display devices, a see-through head-mounted display device that superimposes a virtual image on an outside world image has been proposed (for example, refer to JP-A-2006-3879).

In the see-through head-mounted display device in the related art, since a virtual image is displayed in the entire area where the virtual image can be displayed in a visual field of the user, the visibility of an outside world image is always reduced in the entire area.

SUMMARY

An advantage of some aspects of the invention is to provide a head-mounted display device capable of improving the user's convenience.

(1) An aspect of the invention is directed to a head-mounted display device that allows a user to visually recognize a virtual image in a state where the head-mounted display device is mounted on the head of the user, including: an image processing unit that performs a process of generating an image; and an image display unit having an image light generating unit that generates image light representing the image, and configured such that the user can visually recognize the virtual image and the outside world, wherein the head-mounted display device is configured such that in a partial area of an area where the virtual image can be displayed in a visual field of the user, the outside world can be visually recognized preferentially.

According to the aspect of the invention, the visual field for the outside world can be secured using the partial area of the area where the virtual image can be displayed in the visual field of the user, so that the user's convenience can be improved.

(2) The head-mounted display device may be configured such that the virtual image is visually recognized at an edge portion of the area where the virtual image can be displayed, and the outside world is visually recognized preferentially in the area other than the edge portion.

According to this configuration, the visual field for the outside world can be secured using the area other than the edge portion of the area where the virtual image can be displayed, so that the user's convenience can be improved.

(3) The head-mounted display device may be configured such that the image light generating unit includes a self light emitting element, and the image processing unit generates an image where pixels in an area corresponding to the partial area are black pixels when the outside world is visually recognized preferentially in the partial area.

According to this configuration, the image where the pixels in the area corresponding to the partial area are black pixels is generated, so that the visual field for the outside world can be secured using the partial area of the area where the virtual image can be displayed in the visual field of the user, the partial area corresponding to the area of the black pixels. Therefore, the user's convenience can be improved. Moreover, the image light generating unit is configured using self light emitting elements, so that power consumption at a portion of self light emitting elements can be suppressed, the portion corresponding to the area of the black pixels. Therefore, power consumption can be reduced.

(4) The head-mounted display device may be configured such that the image light generating unit modulates light irradiated from a light source into image light representing the image, the head-mounted display device further includes a light source control unit that controls the light source, the image processing unit generates an image where pixels in an area corresponding to the partial area are black pixels when the outside world is visually recognized preferentially in the partial area, and the light source control unit performs control of adjusting at least one of the luminance and irradiation range of the light source when the image where the pixels in the area corresponding to the partial area are black pixels is generated.

According to this configuration, the image where the pixels in the area corresponding to the partial area are black pixels is generated, so that the visual field for the outside world can be secured using the partial area of the area where the virtual image can be displayed in the visual field of the user, the partial area corresponding to the area of the black pixels. Therefore, the user's convenience can be improved. Moreover, when the image where the pixels in the area corresponding to the partial area are black pixels is generated, an adjustment of, for example, lowering the luminance of light irradiating the image light generating unit (or, not irradiating a portion of the image light generating unit, the portion corresponding to the area of the black pixels) is performed, so that power consumption can be efficiently reduced.

(5) The head-mounted display device may be configured such that the image display unit further has a light guide member that guides the image light to the eye of the user, the light guide member has a light guide portion, a light incident portion that allows the image light to be incident on the light guide portion, and a light exiting portion that allows the image light guided by the light guide portion to exit to the outside, the light guide portion has a first reflecting surface and a second reflecting surface that are arranged in parallel with each other and enable guiding of light through total reflection, the light incident portion has a third reflecting surface at a predetermined angle with respect to the first reflecting surface, the light exiting portion has a fourth reflecting surface at a predetermined angle with respect to the first reflecting surface, image light from the image light generating unit is guided into the light guide member through a different number of times of reflection, and a plurality of image lights formed according to the number of times of reflection is combined via the light exiting portion to exit to the outside.

In the configuration, image light reflected by the third reflecting surface of the light incident portion is propagated while being totally reflected by the first and second reflecting surfaces of the light guide portion. The image light is reflected by the fourth reflecting surface of the light exiting portion to be incident on the eyes of the user as the virtual image. In this case, since the image light from the image light generating unit is guided into the light guide member through a different number of times of reflection, the angular width of the exiting angle of the image light exiting from the light exiting portion can be widened. That is, image lights emitted from the image light generating unit and having different numbers of times of reflection at the light guide member are combined to be extracted as image light forming one virtual image that is partially superimposed. Therefore, the display size of the virtual image observed through the light exiting portion can be secured largely. In this manner, a structure that extracts the image lights having different numbers of times of reflection is adopted, whereby the light exiting portion can be made large so as to cover the pupils without making the light guide portion very thick. Therefore, the eye ring diameter can be secured large, so that favorable see-through observation is also possible.

(6) The head-mounted display device may be configured such that the image light generating unit has a scanning optical system that scans signal light modulated according to the image to thereby allow the signal light to exit as scanning light, and a virtual image forming unit that receives irradiation of the scanning light from the scanning optical system to form a virtual image.

BRIEF DESCRIPTION OF THE DRAWINGS

The invention will be described with reference to the accompanying drawings, wherein like numbers reference like elements.

FIGS. 5A and 5B are conceptual views where optical paths in a first direction and a second direction are developed.

DESCRIPTION OF EXEMPLARY EMBODIMENTS

Hereinafter, preferred embodiments of the invention will be described in detail with reference to the drawings. The embodiments described below do not unduly limit the contents of the invention set forth in the appended claims. Moreover, not all of the configurations described below are necessarily indispensable constituent features of the invention.

First Embodiment

1. Configuration

Figure 1:
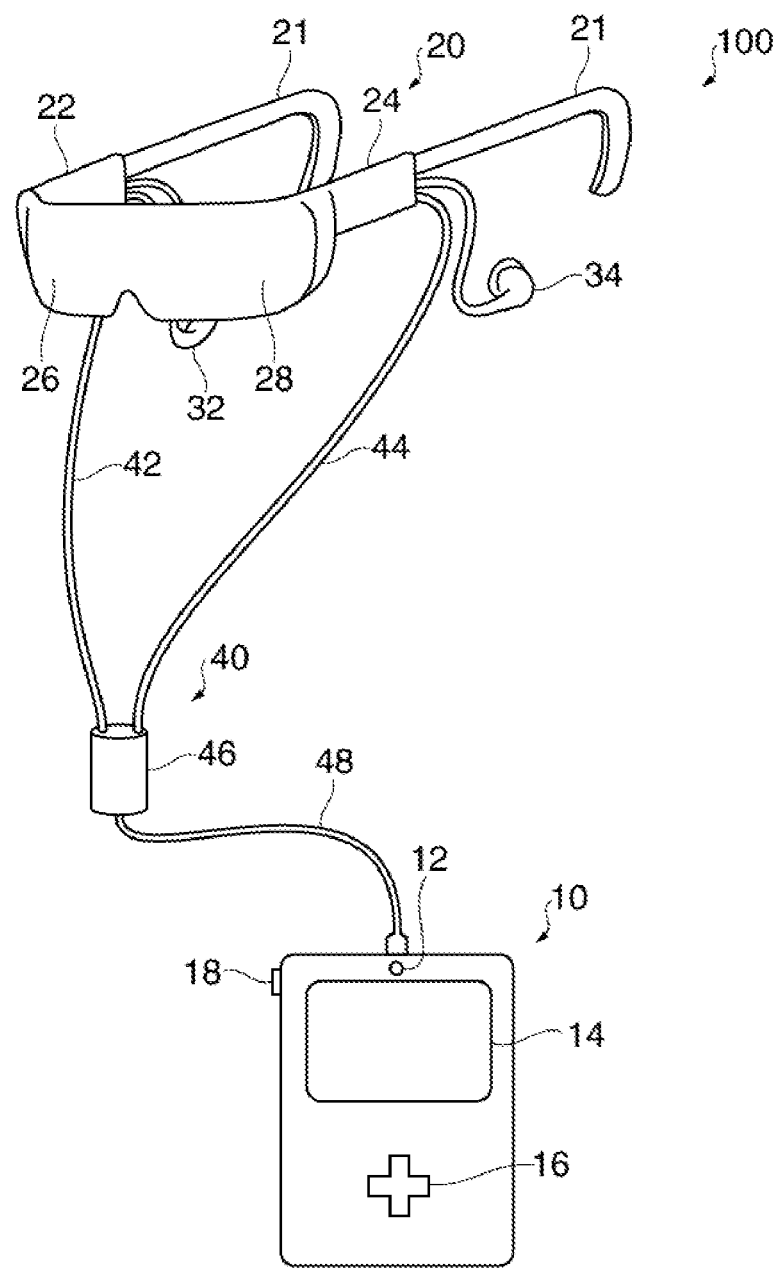
FIG. 1 is an external view showing an example of the configuration of a head-mounted display device according to a first embodiment.

FIG. 1 is an external view showing an example of the configuration of a head-mounted display device according to a first embodiment.

The head-mounted display device 100 is a display device to be mounted on the head and also called a head-mounted display (HMD). The head-mounted display device 100 of the embodiment is an optically transmissive (so-called see-through) head-mounted display device with which a user can visually recognize a virtual image and, at the same time, visually recognize directly an outside scene (outside world image).

The head-mounted display device 100 includes an image display unit 20 that allows the user to visually recognize a virtual image in a state where the image display unit 20 is mounted on the head of the user and a control unit 10 that controls the image display unit 20.

The image display unit 20 is a mounted body to be mounted on the head of the user and has an eyeglasses shape in the embodiment. The image display unit 20 includes ear hook units 21, a right display driving unit 22, a left display driving unit 24, a right optical image display unit 26, and a left optical image display unit 28. The ear hook units 21 are members disposed so as to transverse on the ears of the user from ends of the right display driving unit 22 and the left display driving unit 24, and function as temples. The right optical image display unit 26 and the left optical image display unit 28 are arranged so as to be located in front of the right and left eyes of the user, respectively, in the state where the user wears the image display unit 20. The right display driving unit 22 is arranged at a connecting portion of the ear hook unit 21 for the right ear and the right optical image display unit 26. Moreover, the left display driving unit 24 is arranged at a connecting portion of the ear hook unit 21 for the left ear and the left optical image display unit 28. In the following, the right display driving unit 22 and the left display driving unit 24 are collectively referred to as simply "display driving unit", and the right optical image display unit 26 and the left optical image display unit 28 are collectively referred to as simply "optical image display unit".

The display driving unit includes a driving circuit, an LCD (liquid crystal display), and a projection optical system (not shown). The optical image display unit includes a light guide plate and a light modulating plate (not shown). The light guide plate is formed of a light transmissive resin material or the like and allows image light captured from the display driving unit to exit toward the eyes of the user. The light modulating plate is a thin plate-like optical element and arranged so as to cover the front side (the side opposed to the user's eye side) of the image display unit 20. The light modulating plate protects the light guide plate and prevents the damage, adhesion of dirt, or the like to the light guide plate. Also, the light modulating plate adjusts the light transmittance of the light modulating plate to thereby adjust the amount of external light entering the eyes of the user, so that the easiness of visual recognition of a virtual image can be adjusted. The light modulating plate can be omitted.

The image display unit 20 further has a right earphone 32 for the right ear and a left earphone 34 for the left ear. The right earphone 32 and the left earphone 34 are mounted in the right and left ears, respectively, when the user wears the image display unit 20.

The image display unit 20 further includes a connecting unit 40 for connecting the image display unit 20 to the control unit 10. The connecting unit 40 includes a main body cord 48 connected to the control unit 10, a right cord 42 and a left cord 44 that are two cords branching from the main body cord 48, and a coupling member 46 disposed at the branch portion. The right cord 42 is connected to the right display driving unit 22, while the left cord 44 is connected to the left display driving unit 24. The image display unit 20 and the control unit 10 perform transmission of various kinds of signals via the connecting unit 40. Connectors (not shown) that fit with each other are respectively disposed at an end of the main body cord 48 on the side opposed to the coupling member 46 and at the control unit 10. The control unit 10 and the image display unit 20 can be connected or disconnected by fitting the connector of the main body cord 48 with the connector of the control unit 10 or releasing the fitting. For the main body cord 48, the right cord 42, and the left cord 44, a metal cable or an optical fiber can be adopted.

The control unit 10 is a device for supplying power to the head-mounted display device 100 and controlling the image display unit 20. The control unit 10 includes a lighting unit 12, a touch pad 14, a cross key 16, and a power switch 18. The lighting unit 12 notifies the user of an operation state (for example, the ON or OFF state of a power supply) of the image display unit 20 with the light emission state of the lighting unit. As the lighting unit 12, a light source such as an LED can be used. The touch pad 14 detects a finger operation by the user on an operation surface of the touch pad 14 and outputs a signal corresponding to the detected content. The cross key 16 detects a pressing operation on keys corresponding to up, down, left, and right directions and outputs a signal corresponding to the detected content. The power switch 18 detects a slide operation of the switch to switch a power-on state of the head-mounted display device 100.

Figure 2:
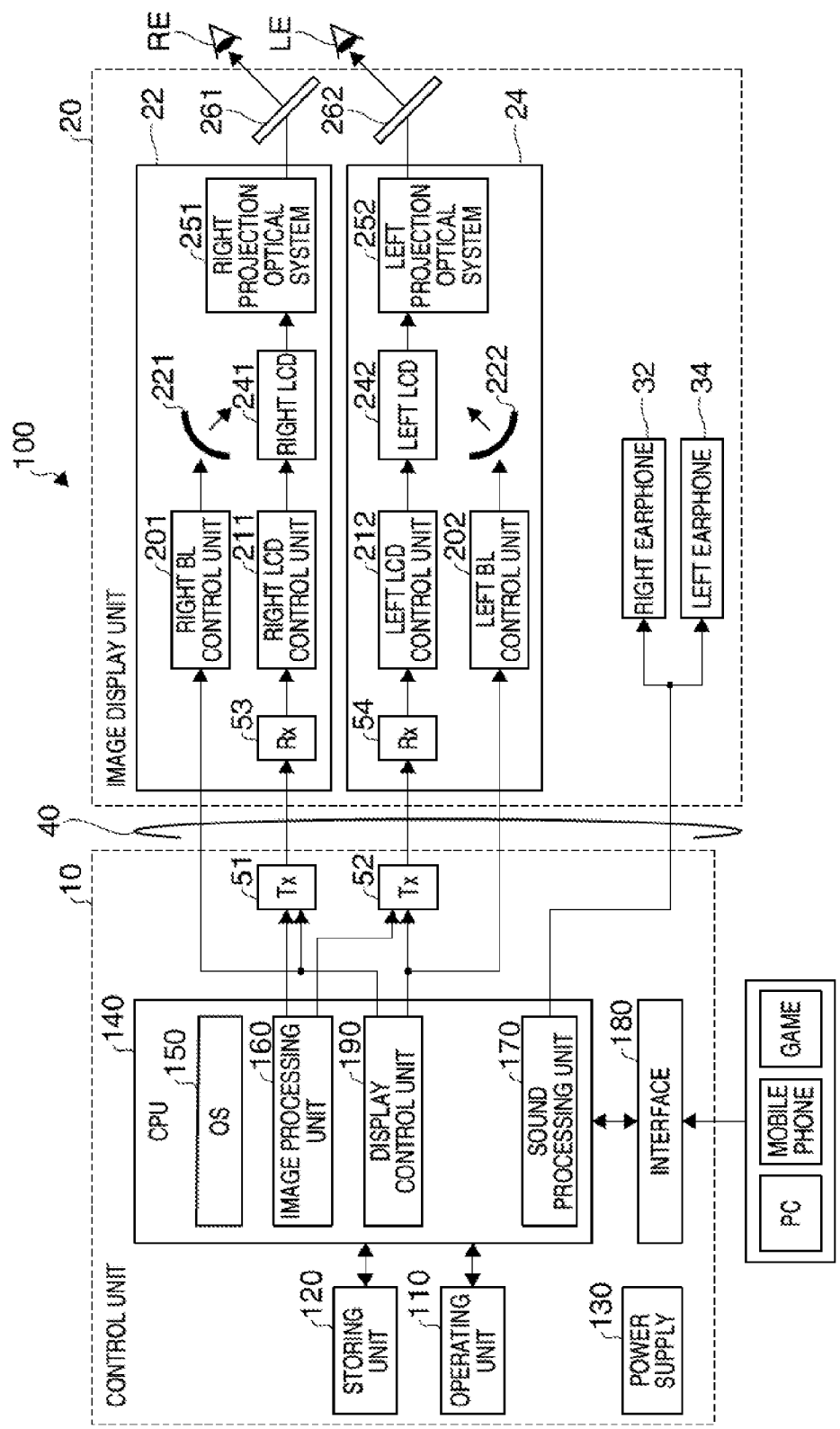
FIG. 2 is a functional block diagram functionally showing the configuration of the head-mounted display device according to the first embodiment.

FIG. 2 is a functional block diagram functionally showing the configuration of the head-mounted display device 100. The control unit 10 includes an operating unit 110 (in the embodiment, the touch pad 14, the cross key 16, and the power switch 18), a storing unit 120, a power supply 130, a CPU 140, an interface 180, and transmitting units (Tx) 51 and 52. The units are connected to one another by a bus (not shown).

The storing unit 120 is a storing unit including a ROM, a RAM, a DRAM, and a hard disk. The power supply 130 supplies power to the units of the head-mounted display device 100. As the power supply 130, a secondary battery, for example, can be used.

The CPU 140 executes a program installed in advance to provide a function as an operating system (OS) 150. Moreover, the CPU 140 expands firmware or a computer program stored in the ROM or the hard disk on the RAM and executes the firmware or the computer program to thereby function also as an image processing unit 160, a sound processing unit 170, and a display control unit 190.

The interface 180 is an interface for connecting various kinds of external apparatuses OA (for example, a personal computer (PC), a mobile-phone terminal, and a game terminal) serving as supply sources of contents to the control unit 10. As the interface 180, the control unit 10 includes, for example, a USB interface, an interface for memory card, and a wireless LAN interface. The contents mean information contents including an image (a still image or a moving image) and sound.

The image processing unit 160 generates, based on contents input via the interface 180, a clock signal, a vertical synchronizing signal, a horizontal synchronizing signal, and image data, and supplies these signals to the image display unit 20 via the connecting unit 40. Specifically, the image processing unit 160 acquires image signals included in the contents. For example, in the case of a moving image, the acquired image signals are generally analog signals including 30 frame images per second. The image processing unit 160 separates synchronizing signals such as a vertical synchronizing signal and a horizontal synchronizing signal from the acquired image signals. Moreover, the image processing unit 160 generates a clock signal using a PLL circuit (not shown) or the like according to periods of the separated vertical synchronizing signal and horizontal synchronizing signal.

The image processing unit 160 converts the analog signals from which the synchronizing signals are separated into digital image signals using an A/D converter (not shown). Thereafter, the image processing unit 160 stores the converted digital image signals, as image data (RGB data) of a target image, in the DRAM in the storing unit 120 frame by frame. The image processing unit 160 may execute on the image data, as necessary, image processing such as resolution conversion processing, various kinds of color tone correction processing including the adjustment of luminance and chroma, or keystone correction processing.

The image processing unit 160 transmits the generated clock signal, vertical synchronizing signal, and horizontal synchronizing signal, and the image data stored in the DRAM in the storing unit 120 via each of the transmitting units 51 and 52. The image data transmitted via the transmitting unit 51 is referred to as "image data for the right eye", while the image data transmitted via the transmitting unit 52 is referred to as "image data for the left eye". The transmitting units 51 and 52 each function as a transceiver for serial transmission between the control unit 10 and the image display unit 20. The image processing unit 160 may generate an image according to the processing result of the various kinds of applications installed in the OS 150, and store the generated image in the DRAM in the storing unit 120.

Especially the image processing unit 160 of the embodiment generates an image (an image including an area formed of contiguous black pixels) where pixels in a partial area are black pixels. For example, if the image processing unit 160 determines based on detection data from the operating unit that an operation for changing pixels in a partial area to black pixels has been performed, the image processing unit 160 may perform a process of changing the pixels in the partial area of an input or generated image (an image of contents input via the interface 180, or an image generated according to the processing result of an application) to black pixels. Alternatively, if a specific application is activated, the image processing unit 160 may generate an image where pixels in a partial area are black pixels according to the processing result of the application. The process of changing pixels in a partial area to black pixels may be performed by a process of filling the partial area of the input or generated image, or may be performed by a process of reducing the input or generated image.

The display control unit 190 generates control signals for controlling the right display driving unit 22 and the left display driving unit 24. Specifically, the display control unit 190 separately controls, according to the control signals, turning on and off of driving of a right LCD 241 with a right LCD control unit 211, turning on and off of driving of a right backlight 221 with a right backlight control unit 201, turning on and off of driving of a left LCD 242 with a left LCD control unit 212, and turning on and off of driving of a left backlight 222 with a left backlight control unit 202, to thereby control the generation and emission of image light with each of the right display driving unit 22 and the left display driving unit 24.

The display control unit 190 transmits control signals for the the right LCD control unit 211 and the left LCD control unit 212 respectively via the transmitting units 51 and 52. Moreover, the display control unit 190 transmits control signals for the right backlight control unit 201 and the left backlight control unit 202 respectively via the transmitting units 51 and 52.

Especially, when an image where pixels in a partial area are black pixels is generated by the image processing unit 160, the display control unit 190 (light source control unit) of the embodiment controls the right backlight control unit 201 and the left backlight control unit 202 to perform control of adjusting at least one of the luminance and irradiation range of the right backlight 221 and the left backlight 222 (light source).

The sound processing unit 170 acquires sound signals included in the contents (or generates sound signals according to the processing result of the various kinds of applications installed in the OS 150), amplifies the acquired or generated sound signals, and supplies the sound signals to the right earphone 32 and the left earphone 34 of the image display unit 20 via the connecting unit 40.

The image display unit 20 includes the right display driving unit 22, the left display driving unit 24, a right light-guide plate 261 constituting the right optical image display unit 26, a left light-guide plate 262 constituting the left optical image display unit 28, the right earphone 32, and the left earphone 34.

The right display driving unit 22 includes a receiving unit (Rx) 53, the right backlight (BL) control unit 201 and the right backlight 221 that function as alight source, the right LCD control unit 211 and the right LCD 241 that function as a display element, and a right projection optical system 251. The right backlight control unit 201, the right LCD control unit 211, the right backlight 221, and the right LCD 241 are collectively referred to as "image light generating unit".

The receiving unit 53 functions as a receiver for serial transmission between the control unit 10 and the image display unit 20. The right backlight control unit 201 has a function of driving the right backlight 221 based on an input control signal. The right backlight 221 (an example of a light source) is, for example, a luminant such as an LED or an electroluminescence (EL). The right LCD control unit 211 has a function of driving the right LCD 241 based on the clock signal, vertical synchronizing signal, horizontal synchronizing signal, and image data for the right eye input via the receiving unit 53. The right LCD 241 is a transmissive liquid crystal panel having a plurality of pixels arranged in a matrix. The image light generating unit has a function of driving liquid crystals corresponding to the positions of the pixels arranged in a matrix in the right LCD 241 to thereby change the transmittance of light transmitting through the right LCD 241 to modulate illumination light irradiated from the right backlight 221 into effective image light representing an image. In the image light generating unit of the embodiment, a backlight system is adopted. However, a configuration may be adopted in which image light is generated using a frontlight system or a reflecting system. The right projection optical system 251 includes a collimate lens that converts image light emitted from the right LCD into light beams in a parallel state. The right light-guide plate 261 guides the image light emitted from the right projection optical system 251 to a right eye RE of the user while reflecting the image light along a predetermined optical path. The right projection optical system 251 and the right light-guide plate 261 are collectively referred to as "light guide unit".

The left display driving unit 24 includes a receiving unit (Rx) 54, the left backlight (BL) control unit 202 and the left backlight 222 that function as a light source, the left LCD control unit 212 and the left LCD 242 that function as a display element, and a left projection optical system 252. The left backlight control unit 202, the left LCD control unit 212, the left backlight 222, and the left LCD 242 are collectively referred to as "image light generating unit". Moreover, the left projection optical system 252 and the left light-guide plate 262 are collectively referred to as "light guide unit". The right display driving unit 22 and the left display driving unit 24 form a pair. The units of the left display driving unit 24 have configurations and functions similar to those of the units described in conjunction with the right display driving unit 22, and therefore detailed descriptions are omitted. The left light-guide plate 262 guides image light emitted from the left projection optical system 252 to a left eye LE of the user while reflecting the image light along a predetermined optical path.

Figure 3:
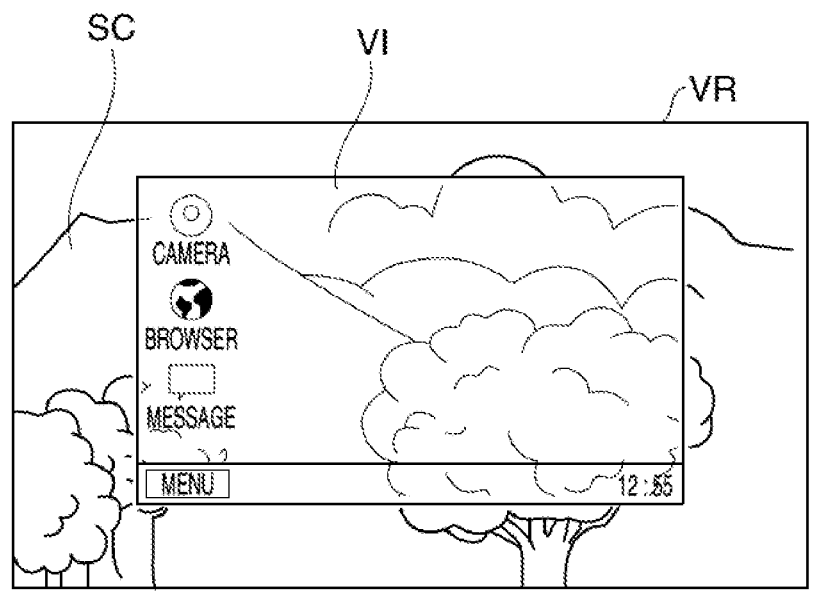
FIG. 3 is an explanatory view showing an example of a virtual image visually recognized by a user.

FIG. 3 is an explanatory view showing an example of a virtual image visually recognized by the user. The image lights guided to the eyes of the user wearing the head-mounted display device 100 as described above are focused on the retinas of the eyes of the user, whereby the user can visually recognize a virtual image. As shown in FIG. 3, a virtual image VI is displayed in a visual field VR of the user of the head-mounted display device 100. In the visual field VR of the user except a portion where the virtual image VI is displayed, the user can see an outside scene SC (outside world image) through the right optical image display unit 26 and the left optical image display unit 28. The head-mounted display device 100 of the embodiment is configured such that in the portion where the virtual image VI is displayed in the visual field VR of the user, the user can also see the outside scene SC through the virtual image VI in the background of the virtual image VI. That is, the head-mounted display device 100 of the embodiment is configured such that the user can visually recognize the virtual image VI and the outside scene SC (outside world image), and that in the portion where the virtual image VI is displayed in the visual field VR, the user can visually recognize the virtual image VI and the outside scene SC (outside world image) in a state where they are superimposed on each other.

2. Optical System

Figure 4A:
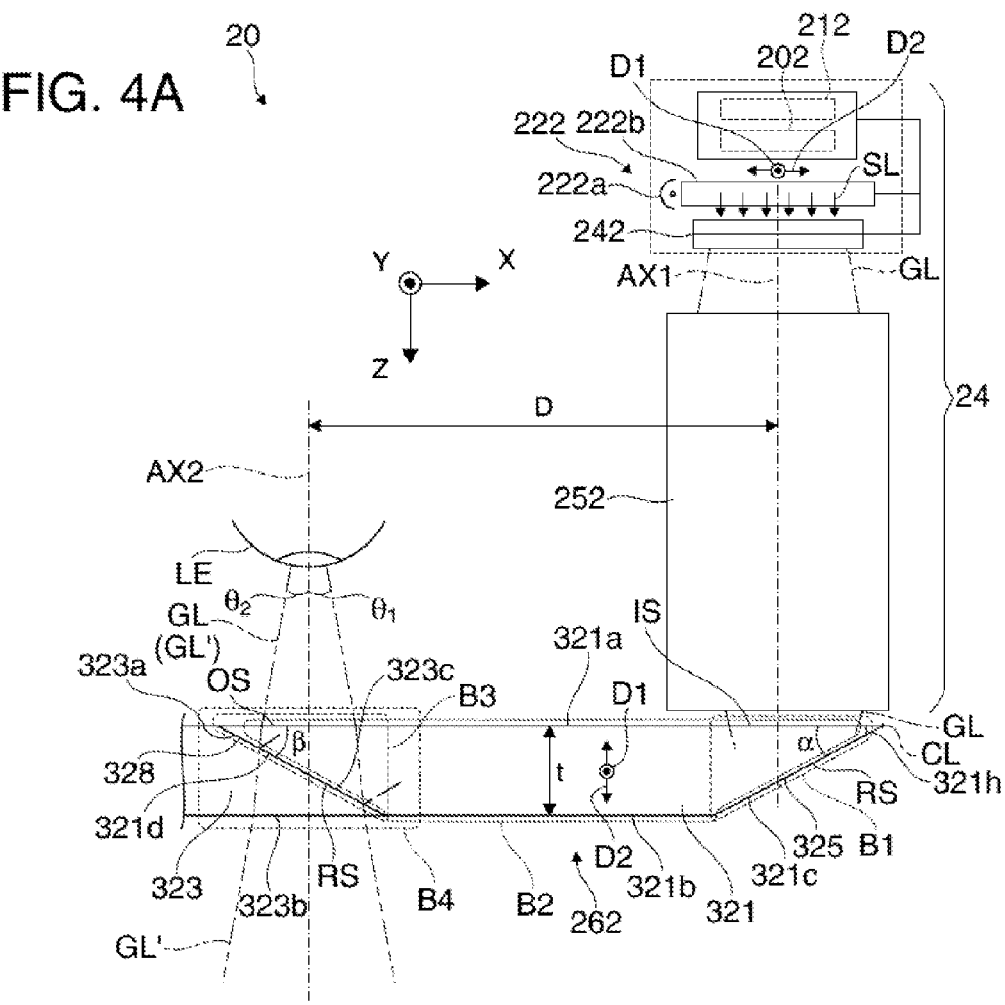
FIGS. 4A and 4B show the configuration of an optical system of an image display unit.
Figure 4B:
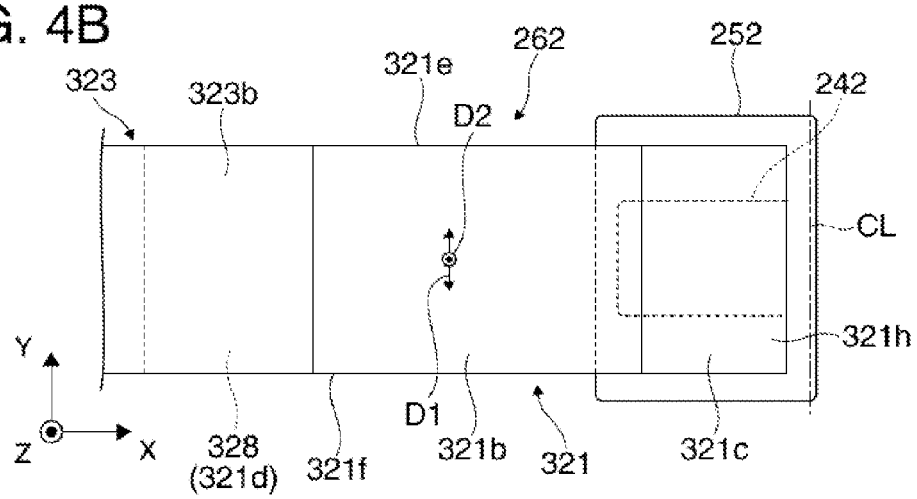

FIGS. 4A and 4B show the configuration of an optical system of the image display unit 20. In the following, the optical system on the left side of the image display unit 20 will be described. A detailed description of an optical system on the right side having a configuration bilaterally symmetrical with respect to the optical system on the left side is omitted.

As shown in FIGS. 4A and 4B, the optical system on the left side of the image display unit 20 includes the left display driving unit 24 and the left light-guide plate 262. The left backlight 222 (an example of a light source) included in the left display driving unit 24 has a light source 222a and a backlight light-guide unit 222b that diffuses light from the light source 222a to convert the light into a light beam having a rectangular cross-section. The left LCD 242 (an example of a display panel) spatially modulates illumination light SL from the left backlight 222 to form image light.

In the left LCD 242, a first direction D1 corresponds to an extension direction of a vertical cross-section including a first optical axis AX1 passing through the left projection optical system 252 and a specific line parallel to a third reflecting surface 321c of a light guide member 321 described later, and a second direction D2 corresponds to an extension direction of a horizontal cross-section including the first optical axis AX1 and a normal line of the third reflecting surface 321c. In other words, the first direction D1 is a direction parallel to an intersection line CL between a first reflecting surface 321a of the light guide member 321 described later and the third reflecting surface 321c, while the second direction D2 is a direction parallel to a plane of the first reflecting surface 321a and orthogonal to the intersection line CL between the first reflecting surface 321a and the third reflecting surface 321c. That is, in regard to the position of the left LCD 242, the first direction D1 corresponds to the vertical Y-direction, while the second direction D2 corresponds to the horizontal X-direction. In regard to an effective size, the left LCD 242 has a horizontally long shape in which a length in the second direction D2 is greater than that in the first direction D1. On the other hand, the exit opening width of the left projection optical system 252 has a vertically long shape in which a length in the first direction D1 is greater than that in the second direction D2.

The left light-guide plate 262 is formed by bonding the light guide member 321 with a light transmissive member 323. The light guide member 321 and the light transmissive member 323 constitute an optical member having a flat plate-shape extending in parallel with an XY plane as a whole.

The light guide member 321 is a trapezoidal prism-shaped member in plan view and has, as side surfaces, the first reflecting surface 321a, a second reflecting surface 321b, the third reflecting surface 321c, and a fourth reflecting surface 321d. Moreover, the light guide member 321 has a top surface 321e and a bottom surface 321f that are adjacent to the first, second, third, and fourth reflecting surfaces 321a, 321b, 321c, and 321d and face each other. Here, the first and second reflecting surfaces 321a and 321b extend along the XY plane and are separated from each other by a thickness t of the light guide member 321. Moreover, the third reflecting surface 321c is inclined at an acute angle α of 45° or less with respect to the XY plane. The fourth reflecting surface 321d is inclined at, for example, an acute angle β of 45° or less with respect to the XY plane. The first optical axis AX1 passing through the third reflecting surface 321c and a second optical axis AX2 passing through the fourth reflecting surface 321d are arranged in parallel with each other and separated from each other by a distance D. As will be described in detail later, an end surface 321h is disposed between the first reflecting surface 321a and the third reflecting surface 321c so as to remove a corner therebetween. When including the end surface 321h, the light guide member 321 has a polyhedral external shape with seven faces.

The light guide member 321 guides light using total reflection by the first and second reflecting surfaces 321a and 321b. In the light guide member 321, there are two directions: one is a direction in which light is turned back by reflection in the guiding of light; and the other is a direction in which light is not turned back by reflection in the guiding of light. When considering an image whose light is guided by the light guide member 321, a horizontal direction in which light is turned back by a plurality of times of reflection in the guiding of light, that is, a confinement direction is orthogonal to the first and second reflecting surfaces 321a and 321b (parallel to the Z-axis) and corresponds to the second direction D2 of the left LCD 242 when an optical path is developed to the light source side as will be described later, while a vertical direction in which light is not turned back by reflection in the guiding of light, that is, a free propagation direction is parallel to the first and second reflecting surfaces 321a and 321b and the third reflecting surface 321c (parallel to the Y-axis) and corresponds to the first direction D1 of the left LCD 242 when an optical path is developed to the light source side as will be described later.

The light guide member 321 is formed of a resin material exhibiting high light-transmitting property for visible light. The light guide member 321 is a block-shaped member integrally molded by injection molding. The light guide member 321 is formed by, for example, injecting a heat polymerization resin material into a metal mold and thermally curing the resin material. As described above, the light guide member 321 is an integrally formed product, but functionally, can be considered as being separated into a light incident portion B1, a light guide portion B2, and a light exiting portion B3.

The light incident portion B1 is a triangular prism-shaped portion and has a light incident surface IS as a portion of the first reflecting surface 321a and the third reflecting surface 321c facing the light incident surface IS. The light incident surface IS is a plane on the rear side or the user's side for capturing image light GL from the left display driving unit 24. The light incident surface IS faces the left projection optical system 252 and extends orthogonally to the first optical axis AX1. The third reflecting surface 321c is a rectangular total reflection mirror for reflecting the image light GL passed through the light incident surface IS to guide the image light GL into the light guide portion B2. The third reflecting surface 321c has a mirror layer 325 and is coated with a protective layer. The mirror layer 325 is a total reflection coating and is formed by applying a deposit through vapor deposition of aluminum or the like on an inclined surface RS of the light guide member 321. The third reflecting surface 321c is inclined at, for example, the acute angle α of from 25° to 27° with respect to the first optical axis AX1 of the left projection optical system 252, or the XY plane. The third reflecting surface 321c deflects the image light GL that is incident from the light incident surface IS toward the positive Z-direction as a whole, so as to be directed to the negative X-direction near the negative Z-direction as a whole, whereby the image light GL is reliably coupled into the light guide portion B2.

The light guide portion B2 has, as two planes facing each other and extending parallel in the XY plane, the first reflecting surface 321a and the second reflecting surface 321b that totally reflect the image light deflected by the light incident portion B1. A distance between the first and second reflecting surfaces 321a and 321b, that is, the thickness t of the light guide member 321 is set to, for example, about 9 mm. Here, it is assumed that the first reflecting surface 321a is located on the rear side or the user's side close to the left display driving unit 24, and that the second reflecting surface 321b is located on the front side or the outside world side far from the left display driving unit 24. In this case, the first reflecting surface 321a is a plane portion that is common to the light incident surface IS or a light exiting surface OS described later. The first and second reflecting surfaces 321a and 321b are total reflecting surfaces using a difference in refractive index, and a reflecting coating such as a mirror layer is not applied to the first and second reflecting surfaces 321a and 321b. However, for preventing surface damage to thereby prevent deterioration in the resolution of a video, the first and second reflecting surfaces 321a and 321b are each coated with a hard coating layer. The hard coating layer is formed by depositing a UV-curable resin, a thermosetting resin, or the like on a flat surface of the light guide member 321 through a dipping process or a spray coating process. The image light GL reflected by the third reflecting surface 321c of the light incident portion B1 is first incident on the first reflecting surface 321a and totally reflected. Next, the image light GL is incident on the second reflecting surface 321b and totally reflected. Subsequently, these operations are repeated, so that the image light GL is guided to the internal side of the left light-guide plate 262, that is, the negative X-side where the light exiting portion B3 is disposed. Since a reflecting coating is not applied to the first and second reflecting surfaces 321a and 321b, outside world light or external light incident on the second reflecting surface 321b from the outside world side passes through, with high transmittance, the light guide portion B2. That is, the light guide portion B2 is of a see-through type that makes it possible to see an outside world image in a see-through manner. The above-described total reflection on the first and second reflecting surfaces 321a and 321b depends on the settings of the refractive index of the hard coating layer. The total reflection can be caused at an inner side of a surface of the hard coating layer, but can be caused also at an inner side of the flat surface.

The light exiting portion B3 is a triangular prism-shaped portion and has the light exiting surface OS as a portion of the first reflecting surface 321a and the fourth reflecting surface 321d facing the light exiting surface OS. The light exiting surface OS is a plane on the front side for allowing the image light GL to exit toward the left eye LE of the user. Similarly to the light incident surface IS, the light exiting surface OS is a portion of the first reflecting surface 321a and extends orthogonally to the second optical axis AX2. The distance D between the second optical axis AX2 passing through the light exiting portion B3 and the first optical axis AX1 passing through the light incident portion B1 is set to, for example, 50 mm in consideration of the width of the head of the user, or the like. The fourth reflecting surface 321d is a rectangular flat surface for reflecting the image light GL incident through the first and second reflecting surfaces 321a and 321b to allow the image light GL to exit to the outside of the light exiting portion B3, and has a half mirror layer 328. The half mirror layer 328 is formed by applying a deposit through vapor deposition of Ag or the like on the inclined surface RS of the light guide member 321. The reflectance of the half mirror layer 328 is set to, for example, 20%, and the transmittance thereof is set to, for example, 80%. The fourth reflecting surface 321d is inclined at, for example, the acute angle β of from 25° to 27° with respect to the second optical axis AX2 orthogonal to the first reflecting surface 321a, or the XY plane. The fourth reflecting surface 321d partially reflects the image light GL incident through the first and second reflecting surfaces 321a and 321b of the light guide portion B2 to deflect the image light GL so as to be directed to the negative Z-direction as a whole, thereby allowing the image light GL to pass through the light exiting surface OS. The image light GL transmitted through the fourth reflecting surface 321d is incident on the light transmissive member 323 and not used for the formation of a video.

The light transmissive member 323 has the same refractive index as that of the main body of the light guide member 321 and has a first surface 323a, a second surface 323b, and a third surface 323c. The first and second surfaces 323a and 323b extend along the XY plane. Moreover, the third surface 323c is inclined with respect to the XY plane and arranged to face and be in parallel with the fourth reflecting surface 321d of the light guide member 321. The light transmissive member 323 is a block-shaped member integrally molded by injection molding. The light transmissive member 323 is formed by, for example, injecting a heat polymerization resin material into a metal mold and thermally curing the resin material. In the light transmissive member 323, the first surface 323a is arranged on an extension plane of the first reflecting surface 321a disposed in the light guide member 321, and located at the rear side close to the left eye LE of the user. The second surface 323b is arranged on an extension plane of the second reflecting surface 321b disposed in the light guide member 321, and located on the front side far from the left eye LE of the user. The third surface 323c is a rectangular transmissive surface bonded to the fourth reflecting surface 321d of the light guide member 321 with adhesive.

The light transmissive member 323 and the light guide member 321 constitute a see-through portion B4 at the bonding portion of the light transmissive member 323 and the light guide member 321 and in the vicinity of the bonding portion. That is, since a reflecting coating such as a mirror layer is not applied to the first and second surfaces 323a and 323b, outside world light GL' is transmitted with a high transmittance, similarly to the light guide portion B2 of the light guide member 321. Also the third surface 323c can transmit the outside world light GL' therethrough with a high transmittance. However, since the fourth reflecting surface 321d of the light guide member 321 has the half mirror layer 328, the outside world light GL' passing through the third surface 323c is reduced by, for example, 20%. That is, the user observes a superimposition of the image light GL that is reduced to 20% and the outside world light GL' that is reduced to 80%.

FIG. 5A is a conceptual view where an optical path in the first direction D1 corresponding to a vertical cross-section CS1 of the left LCD 242 is developed. In the vertical cross-section CS1 along the first direction D1, that is, in a YZ plane (a Y' Z' plane after development), a component of image light emitted from the left LCD 242 is defined as image light GLa, the component being emitted from the upper end side (positive Y-side) of a display area 242b, while a component emitted from the lower end side (negative Y-side) of the display area 242b is defined as image light GLb.

The image light GLa on the upper side is converted into a parallel light beam by the left projection optical system 252, passes through the light incident portion B1, the light guide portion B2, and the light exiting portion B3 of the light guide member 321 along a developed optical axis AX', and is obliquely incident, in the parallel light beam state, on the left eye LE of the user from the upper direction at an angle $\phi_1$ with respect to the left eye LE of the user. On the other hand, the image light GLb on the lower side is converted into a parallel light beam by the left projection optical system 252, passes through the light incident portion B1, the light guide portion B2, and the light exiting portion B3 of the light guide member 321 along the developed optical axis AX', and is obliquely incident, in the parallel light beam state, on the left eye LE of the user from the lower direction at an angle $\phi_2$ ($|\phi_1|=|\phi_2|$) with with respect to the left eye LE of the user. The angles $\phi_1$ and $\phi_2$ described above correspond to upper and lower half angles of view and are set to, for example, 6.5°. The image light GLa on the upper side and the image light GLb on the lower side are not incident on the left eye LE of the user with a time interval, but incident on the left eye LE of the user simultaneously.

FIG. 5B is a conceptual view where an optical path in the second direction (confinement direction or combination direction) D2 corresponding to a horizontal cross-section CS2 of the left LCD 242 is developed. In the horizontal cross-section CS2 along the second direction D2, that is, in an XZ plane (X' Z' plane after development), a component of image light emitted from the left LCD 242, the component being emitted from a first display point P1 on the right-end side (positive X-side) to the display area 242b is defined as image light GLc, while a component emitted from a second display point P2 on the left-end side (negative X-side) to the display area 242b is defined as image light GLd. In FIG. 5B, image light GLe emitted from the right inner side and image light GLf emitted from the left inner side are added for reference.

The image light GLc from the first display point P1 on the right side is converted into a parallel light beam by the left projection optical system 252, passes through the light incident portion B1, the light guide portion B2, and the light exiting portion B3 of the light guide member 321 along the developed optical axis AX', and is obliquely incident, in the parallel light beam state, on the left eye LE of the user from the right direction at an angle $\theta_1$ with respect to the left eye LE of the user. On the other hand, the image light GLd from the second display point P2 on the left side is converted into a parallel light beam by the left projection optical system 252, passes through the light incident portion B1, the light guide portion B2, and the light exiting portion B3 of the light guide member 321 along the developed optical axis AX', and is obliquely incident, in the parallel light beam state, on the left eye LE of the user from the left direction at an angle $\theta_2$ ($|\theta_1|=|\theta_2|$) with respect to the left eye LE of the user. The angles $\theta_1$ and $\theta_2$ described above correspond to left and right half angles of view and are set to, for example, 10°. The image light GLc on the right side and the image light GLd on the left side are not incident on the left eye LE of the user with a time interval, but incident on the left eye LE of the user simultaneously.

In regard to the horizontal direction of the second direction D2, since the image lights GLc and GLd are turned back by reflection in the light guide member 321 and the number of times of reflection is different, each of the image lights GLc and GLd is expressed discontinuously in the light guide member 321. Consequently, in regard to the horizontal direction, a screen is horizontally inverted as a whole. However, as will be described in detail later, a right half image of the left LCD 242 and a left half image of the left LCD 242 are continuously joined without a gap or misalignment by processing the light guide member 321 with high accuracy. In consideration of the difference in the number of times of reflection of the image lights GLc and GLd in the light guide member 321, an exiting angle $\theta_1'$ of the image light GLc on the right side and an exiting angle $\theta_2'$ of the image light GLd on the left side are set differently from each other.

As described above, the image lights GLa, GLb, GLc, and GLd incident on the left eye LE of the user are virtual images from infinity. In regard to the vertical first direction D1, a video formed on the left LCD 242 is erected, while in regard to the horizontal second direction D2, a video formed on the left LCD 242 is inverted.

Figure 6:
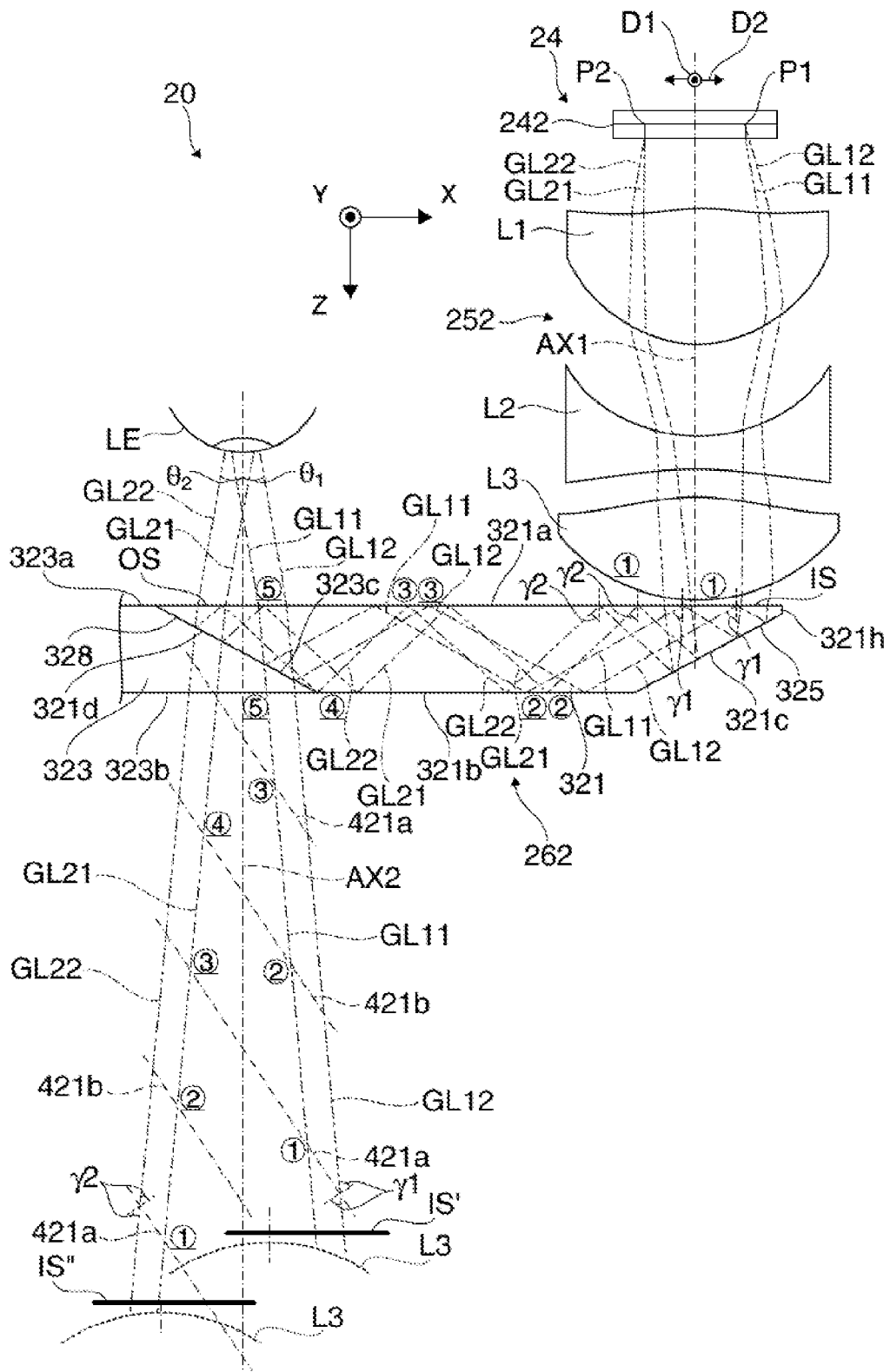
FIG. 6 is a cross-sectional view explaining specific optical paths in the image display unit.

FIG. 6 is a cross-sectional view explaining specific optical paths in the image display unit 20. The left projection optical system 252 has three lenses L1, L2, and L3.

Image lights GL11 and GL12 from the first display point P1 on the right side of the left LCD 242 are converted into parallel light beams by passing through the lenses L1, L2, and L3 of the left projection optical system 252, and incident on the light incident surface IS of the light guide member 321. The image lights GL11 and GL12 guided into the light guide member 321 repeat total reflection at an equal angle on the first and second reflecting surfaces 321a and 321b, and eventually exit from the light exiting surface OS as parallel light beams. Specifically, the image lights GL11 and GL12 are reflected as parallel light beams by the third reflecting surface 321c of the light guide member 321, then incident on the first reflecting surface 321a of the light guide member 321 at a first reflection angle γ1, and totally reflected (the first total reflection). Thereafter, the image lights GL11 and GL12 are incident on the second reflecting surface 321b with the first reflection angle γ1 held, and totally reflected (the second total reflection). Next, the image lights GL11 and GL12 are incident again on the first reflecting surface 321a and totally reflected (the third total reflection). Consequently, the image lights GL11 and GL12 are totally reflected three times in total on the first and second reflecting surfaces 321a and 321b, and incident on the fourth reflecting surface 321d. The image lights GL11 and GL12 are reflected by the fourth reflecting surface 321d at the same angle as that of the third reflecting surface 321c, and exit from the light exiting surface OS as parallel light beams at the angle $\theta_1$ with respect to the direction of the second optical axis AX2 orthogonal to the light exiting surface OS.

Image lights GL21 and GL22 from the second display point P2 on the left side of the left LCD 242 are converted into parallel light beams by passing through the lenses L1, L2, and L3 of the left projection optical system 252, and incident on the light incident surface IS of the light guide member 321. The image lights GL21 and GL22 guided into the light guide member 321 repeat total reflection at an equal angle on the first and second reflecting surfaces 321a and 321b, and eventually exit from the light exiting surface OS as parallel light beams. Specifically, the image lights GL21 and GL22 are reflected as parallel light beams by the third reflecting surface 321c of the light guide member 321, then incident on the first reflecting surface 321a of the light guide member 321 at a second reflection angle γ2 (γ2<γ1), and totally reflected (the first total reflection). Thereafter, the image lights GL21 and GL22 are incident on the second reflecting surface 321b with the second reflection angle γ2 held, and totally reflected (the second total reflection). Again, the image lights GL21 and GL22 are incident on the first reflecting surface 321a and totally reflected (the third total reflection). Again, the image lights GL21 and GL22 are incident on the second reflecting surface 321b and totally reflected (the fourth total reflection). And again, the image lights GL21 and GL22 are incident on the first reflecting surface 321a and totally reflected (the fifth total reflection). Consequently, the image lights GL21 and GL22 are totally reflected five times in total on the first and second reflecting surfaces 321a and 321b, and incident on the fourth reflecting surface 321d. The image lights GL21 and GL22 are reflected by the fourth reflecting surface 321d at the same angle as that of the third reflecting surface 321c, and exit from the light exiting surface OS as parallel light beams at the angle $\theta_2$ with respect to the direction of the second optical axis AX2 orthogonal to the light exiting surface OS.

In FIG. 6, a virtual first surface 421a corresponding to the first reflecting surface 321a when the light guide member 321 is developed and a virtual second surface 421b corresponding to the second reflecting surface 321b when the light guide member 321 is developed are illustrated. With the development described above, it is found that the image lights GL11 and GL12 from the first display point P1 pass through an incident equivalent surface IS' corresponding to the light incident surface IS, pass through the first surface 421a twice, pass through the second surface 421b once, exit from the light exiting surface OS, and are incident on the left eye LE of the user, and that the image lights GL21 and GL22 from the second display point P2 pass through an incident equivalent surface IS" corresponding to the light incident surface IS, pass through the first surface 421a three times, pass through the second surface 421b twice, exit from the light exiting surface OS, and are incident on the left eye LE of the user. From a different point of view, the user observes, in an overlapped manner, the lenses L3 of the left projection optical system 252 present in the vicinity of the two incident equivalent surfaces IS' and IS" at different positions.

Figure 7A:
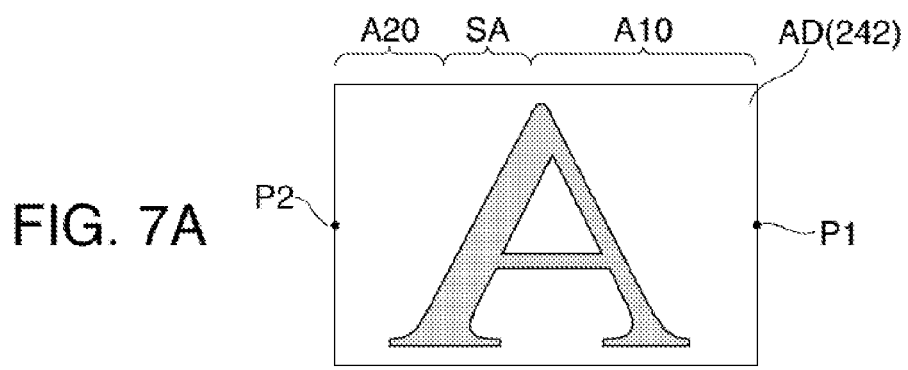
FIG. 7A conceptually explains a display surface of a display panel.
Figure 7B:
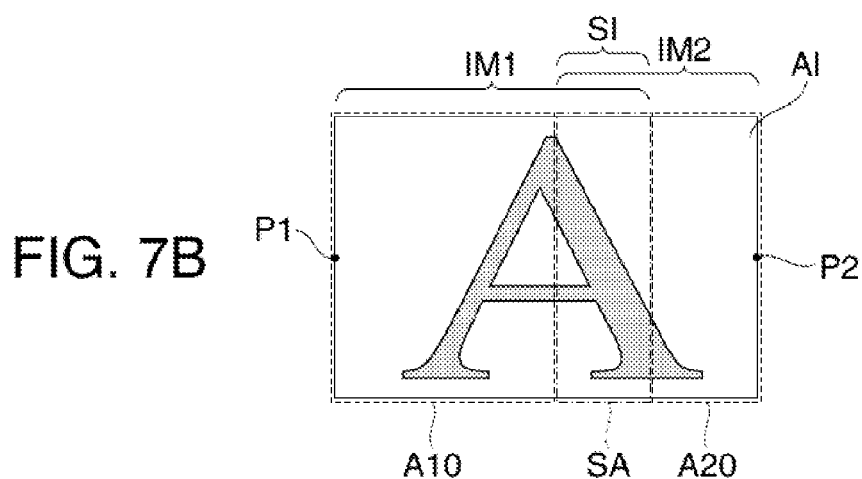
FIG. 7B conceptually explains a virtual image of the display panel seen by the user.
Figure 7C:
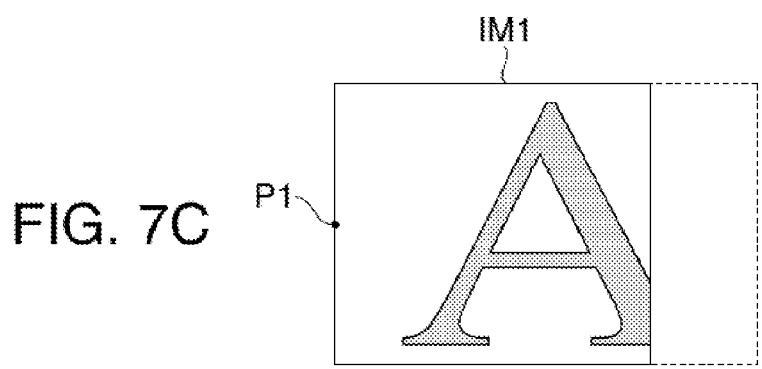
FIGS. 7C and 7D explain partial images constituting the virtual image.
Figure 7D:
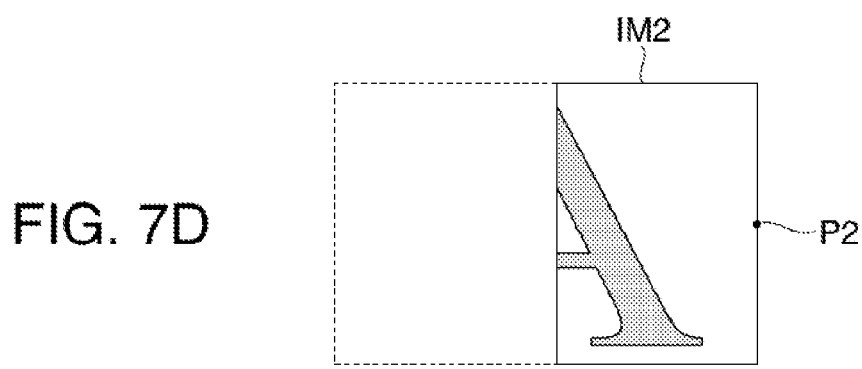

FIG. 7A conceptually explains a display surface of the left LCD 242. FIG. 7B conceptually explains a virtual image of the left LCD 242 to be seen by the user. FIGS. 7C and 7D explain partial images constituting the virtual image. A rectangular image forming area AD disposed in the left LCD 242 shown in FIG. 7A is observed as a virtual image display area AI shown in FIG. 7B. On the left of the virtual image display area AI, a first projection image IM1 corresponding to a portion from the center to the right of the image forming area AD of the left LCD 242 is formed. The first projection image IM1 is a partial image where the right thereof is deficient as shown in FIG. 7C. Moreover, on the right of the virtual image display area AI, a second projection image IM2 corresponding to a portion from the center to the left of the image forming area AD of the left LCD 242 is formed as the virtual image. The second projection image IM2 is a partial image where a left half is deficient as shown in FIG. 7D. In this case, the first projection image IM1 shown in FIG. 7C and the second projection image IM2 shown in FIG. 7D are simultaneously incident on the left eye LE of the user and simultaneously form an image.

A first partial area A10 for only forming the first projection image (virtual image) IM1 in the left LCD 242 shown in FIG. 7A includes, for example, the first display point P1 at the right end of the left LCD 242. The first partial area A10 emits the image lights GL11 and GL12 that are totally reflected three times in total at the light guide portion B2 of the light guide member 321. A second partial area A20 for only forming the second projection image (virtual image) IM2 in the left LCD 242 includes, for example, the second display point P2 at the left end of the left LCD 242. The second partial area A20 emits the image lights GL21 and GL22 that are totally reflected five times in total at the light guide portion B2 of the light guide member 321. Image lights from a zone SA interposed between the first and second partial areas A10 and A20 and longitudinally extending near the center of the image forming area AD of the left LCD 242 form a superimposed image SI shown in FIG. 7B. That is, the image lights from the zone SA of the left LCD 242 become the first projection image IM1 formed of the image lights GL11 and GL12 that are totally reflected three times in total at the light guide portion B2 and the second projection image IM2 formed of the image lights GL21 and GL22 that are totally reflected five times in total at the light guide portion B2, and the first projection image IM1 and the second projection image IM2 are superimposed on each other on the virtual image display area AI. When the light guide member 321 is precisely processed and light beams accurately collimated by the left projection optical system 252 are formed, it is possible to prevent the misalignment or blur of the superimposed image SI due to the superimposition of the two projection images IM1 and IM2. The horizontal width or superimposition width of the zone SA where the superimposition occurs can be adjusted by controlling the angular range of the illumination light SL that illuminates the left LCD 242. In the embodiment, since the angular range of the illumination light SL is not particularly adjusted, the zone SA having the horizontal width or superimposition width according to the divergence characteristic of the backlight light-guide unit 222b or the like is present.

In the above, the number of times of total reflection of the image lights GL11 and GL12 by the first and second reflecting surfaces 321a and 321b is set to three in total, the image lights GL11 and GL12 being emitted from the first partial area A10 including the first display point P1 on the right side of the left LCD 242, and the number of times of total reflection of the image lights GL21 and GL22 by the first and second reflecting surfaces 321a and 321b is set to five in total, the image lights GL21 and GL22 being emitted from the second partial area A20 including the second display point P2 on the left side of the left LCD 242. However, the number of times of total reflection can be appropriately changed. That is, by adjusting the external shape (that is, the thickness t, the distance D, and the acute angles α and β of the light guide member 321, the number of times of total reflection of the image lights GL11 and GL12 can be set to five in total, and the number of times of total reflection of the image lights GL21 and GL22 can be set to seven in total. Moreover, in the above, the numbers of times of total reflection of the image lights GL11, GL12, GL21, and GL22 are odd numbers. However, when the light incident surface IS and the light exiting surface OS are arranged on the opposite sides, that is, when the light guide member 321 is made into a parallelogram shape in plan view, the numbers of times of total reflection of the image lights GL11, GL12, GL21, and GL22 are even numbers.

3. Method of Embodiment

Figure 8A:
FIG. 8A shows an example of the display surface of the display panel in the case where the image processing unit generates an image where pixels in a partial area are black pixels.

The head-mounted display device 100 of the embodiment is configured such that in a partial area of an area (the virtual image display area AI) where a virtual image can be displayed in the visual field VR of the user, the outside world can be visually recognized preferentially. When the outside world is visually recognized preferentially in the partial area, the image processing unit 160 generates an image where pixels in an area corresponding to the partial area are black pixels. FIG. 8A shows a display surface of the left LCD 242 (the right LCD 241) in the case where the image processing unit 160 generates the image where the pixels in the area corresponding to the partial area are black pixels; and FIG. 8B shows a virtual image and an outside world image visually recognized by the user at that time.

FIG. 8A shows an example of the case where the image processing unit 160 generates an image where pixels in an area other than an area for displaying a text (caption) are black pixels according to, for example, the processing result of an application for caption display that acquires text data (caption data) from the external apparatus OA to display the data. In a lower area A30 of the image forming area AD of the left LCD 242 shown in FIG. 8A, an image representing the text is formed. In an upper area A32, black pixels (black display) are formed. It is desirable that an area for displaying a text or the like (an area other than an area for forming black pixels) is arranged at an edge portion (peripheral portion) of the image forming area AD.

Figure 8B:
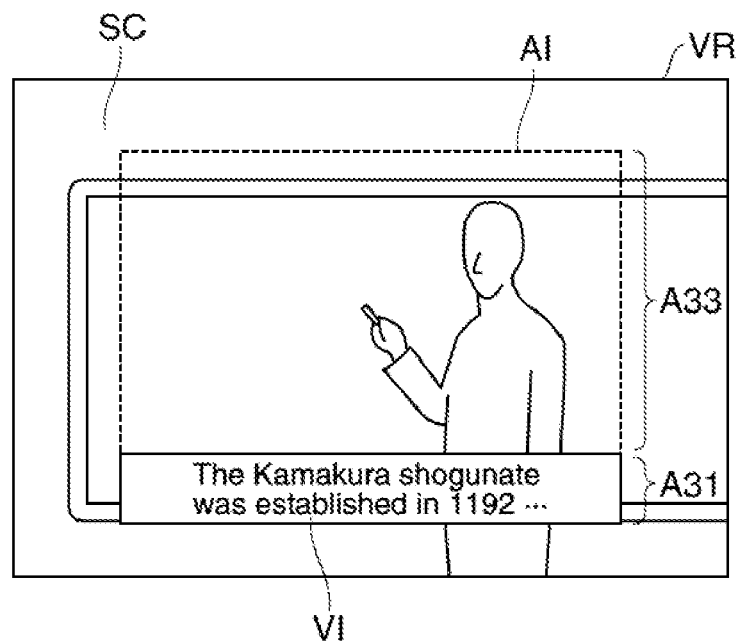
FIG. 8B shows an example of a virtual image and an outside world image visually recognized by the user.

In this case, as shown in FIG. 8B, the virtual image VI (an image where the virtual image VI and the outside scene SC are superimposed on each other) representing the text is displayed in an area A31 of the virtual image display area AI in the visual field VR of the user, the area A31 corresponding to the area A30 where the image representing the text is formed on the left LCD 242. Moreover, a virtual image is not displayed in an area A33 of the virtual image display area AI, the area A33 corresponding to the area A32 where black pixels are formed on the left LCD 242. In the area A33, the user can see the outside scene SC (outside world image). Since black characters are displayed on a white background in the area A30 of FIG. 8A and the area A31 of FIG. 8B, the outside scene SC can be actually seen in a see-through manner at the portions of the black characters of the area A31. However, the portions appear black to the human eye. Moreover, in this case, even a black character can be visually recognized by optimizing the ratio of areas of white display and black display. Moreover, a background color and a character color can be selected so as to enhance visibility. For example, for enhancing visibility, a character color can be set to the complementary color of a background color.

In this manner, an image where pixels in an area other than an area for displaying an image to be visually recognized by the user are black pixels is generated, so that it is possible to secure a visual field for the outside world using an area of the virtual image display area AI where a virtual image can be displayed in the visual field of the user, the area corresponding to the area of the black pixels. FIG. 8B shows an example of the case where a text for complementing the content of a lesson is displayed using the head-mounted display device 100. In the example of FIG. 8B, it is possible to allow the user to visually recognize easily a teacher or writing on a blackboard as the outside scene SC, while allowing the user to visually recognize the text as the virtual image VI using a partial area of the virtual image display area AI, so that the user's convenience can be improved. Moreover, the virtual image VI is displayed at the edge portion (in the example of FIG. 8B, the area A31) of the virtual image display area AI, so that a main part (in the example of FIG. 8B, a teacher or writing on a blackboard) of the outside scene SC can be visually recognized more easily.

Further, in the head-mounted display device 100 of the embodiment, when an image where pixels in a partial area are black pixels is generated by the image processing unit 160, control of adjusting at least one of the luminance and irradiation range of the right backlight 221 and the left backlight 222 is performed.

Figure 9A:
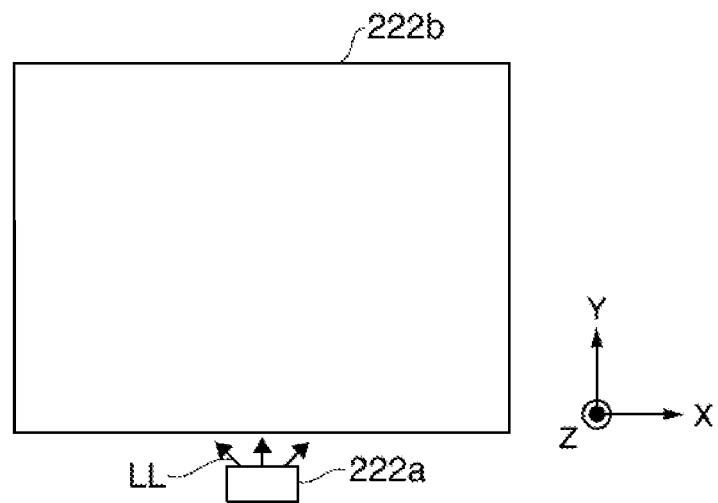
FIGS. 9A and 9B show an example of the configuration of a backlight (light source).
Figure 9B:
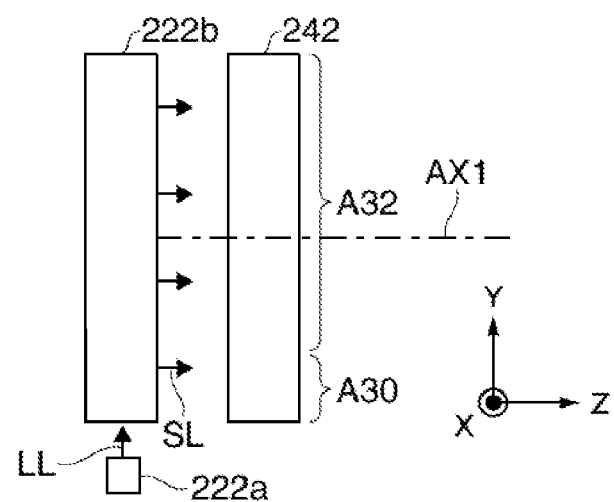

FIGS. 9A and 9B show an example of the configuration of the left backlight 222 (the right backlight 221). In the example shown in FIGS. 9A and 9B, the left backlight 222 (the right backlight 221) includes the light source 222a as a single light source and the backlight light-guide unit 222b that diffuses light LL from the light source 222a to irradiate the left LCD 242 (the right LCD 241) with the light LL as the illumination light SL. The backlight light-guide unit 222b is arranged on the back (negative Z-direction side) of the left LCD 242, while the light source 222a is arranged below (negative Y-direction side) the backlight light-guide unit 222b.

In the configuration shown in FIGS. 9A and 9B, when the image shown in FIG. 8A is generated for example, the illumination light SL from the backlight light-guide unit 222b transmits through only the area A30 where the image of the text is formed in the left LCD 242, but does not transmit through the area A32 where black pixels are formed in the left LCD 242. Therefore, in such a case, the display control unit 190 (light source control unit) performs control of lowering the luminance of the light source 222a to that sufficient to irradiate the area A30 on the left LCD 242. By doing this, the power consumption of the light source 222a can be efficiently reduced.

Figure 10A:
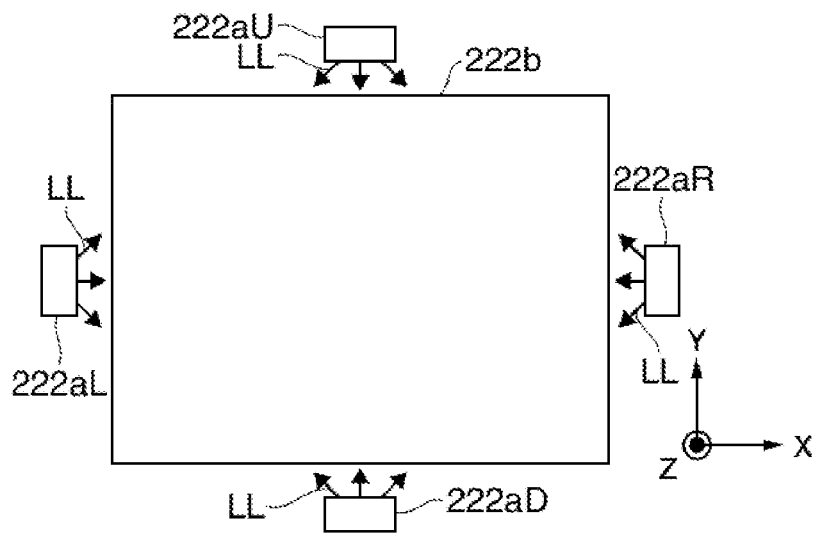
FIG. 10A shows an example of the configuration of the backlight (light source)

Moreover, a plurality of light sources may be used as the light source 222a. For example, as shown in FIG. 10A, four light sources 222aU, 222aD, 222aR, and 222aL may be arranged above (positive Y-direction), below (negative Y-direction), to the right of (positive X-direction), and to the left of (negative X-direction) the backlight light-guide unit 222b to constitute the left backlight 222 (the right backlight 221). The four light sources 222aU, 222aD, 222aR, and 222aL are light sources for respectively irradiating mainly an upper area, a lower area, a right area, and a left area on the left LCD 242 with illumination light.

Figure 10B:
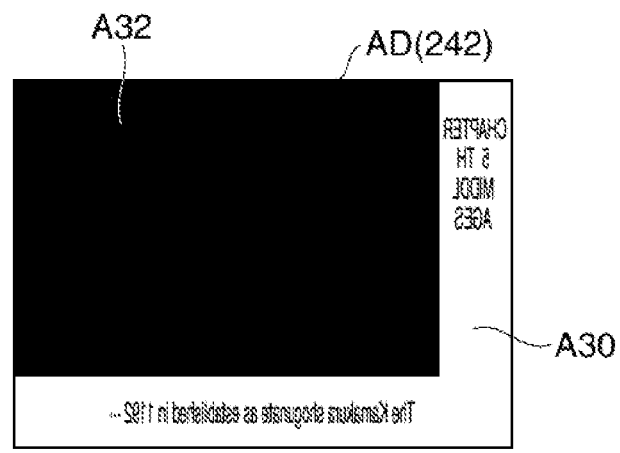
FIG. 10B shows an example of the display surface of the display panel.

In the configuration shown in FIG. 10A, when the image shown in FIG. 8A is generated for example, the display control unit 190 (light source control unit) performs control of only allowing the light source 222aD to emit light and not allowing the light source 222aU, the light source 222aR, and the light source 222aL to emit light, thereby performing control of mainly irradiating the area A30 on the left LCD 242 with the illumination light SL. Moreover, as shown in FIG. 10B for example, when an image representing a text is formed in the area A30 having a predetermined width including the lower and right ends of the image forming area AD of the left LCD 242 and black pixels are formed in the other area A32, the display control unit 190 performs control of only allowing the light source 222aD and the light source 222aR to emit light and not allowing the light source 222aU and the light source 222aL to emit light, thereby performing control of mainly irradiating the area A30 on the left LCD 242 with the illumination light SL. In this manner, only one light source 222a of the plurality of light sources 222a is allowed to emit light to perform the control of adjusting the irradiation range, and the area A32 where black pixels are formed on the left LCD 242 is set not to fall within the irradiation range, so that the power consumption of the light source 222a can be efficiently reduced.

Figure 11A:
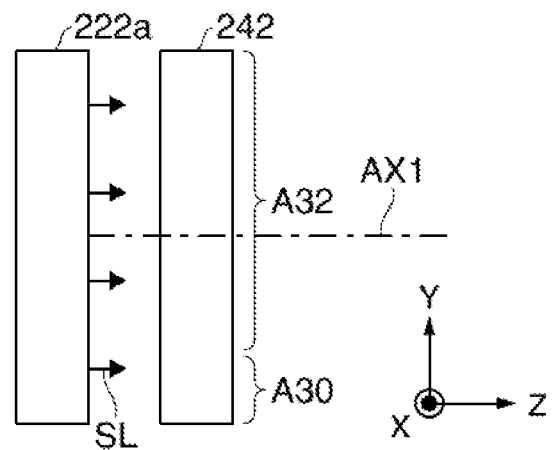
FIG. 11A shows an example of the configuration of the backlight (light source)
Figure 11B:
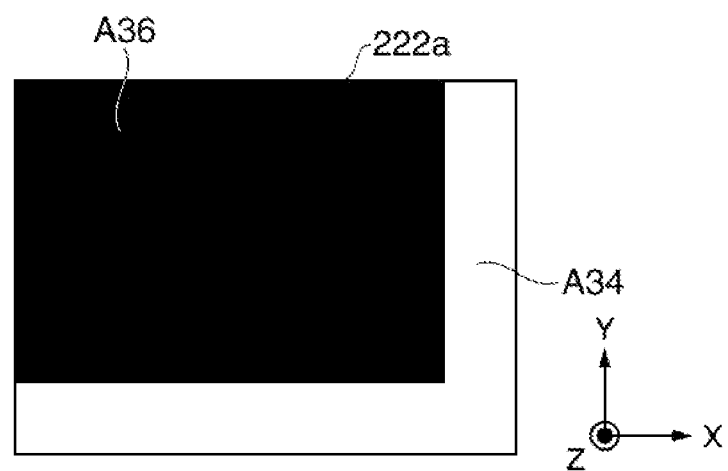
FIG. 11B shows an example of the display surface of the display panel.

Moreover, as shown in FIG. 11A, the light source 222a may be configured such that an organic EL panel is used as the light source 222a, and that the organic EL panel is arranged on the back (negative Z-direction side) of the left LCD 242 to directly irradiate the left LCD 242 (the right LCD 241) with light (the illumination light SL) from the light source 222a. In the configuration shown in FIG. 11A, when the image shown in FIG. 10B is generated for example, the display control unit 190 (light source control unit) performs control of only allowing an area A34 (an area where light incident on the area A30 is generated) on the light source 222a, corresponding to the area A30 on the left LCD 242, to emit light as shown in FIG. 11B, and not allowing an area A36 (an area where light incident on the area A32 is generated) on the light source 222a, corresponding to the area A32 on the left LCD 242, to emit light. In this manner, the control of adjusting the light emission area on the light source 222a is performed, and the area A32 where black pixels are formed on the left LCD 242 is set not to fall within the irradiation range, so that the power consumption of the light source 222a can be efficiently reduced.

Second Embodiment

Figure 12:
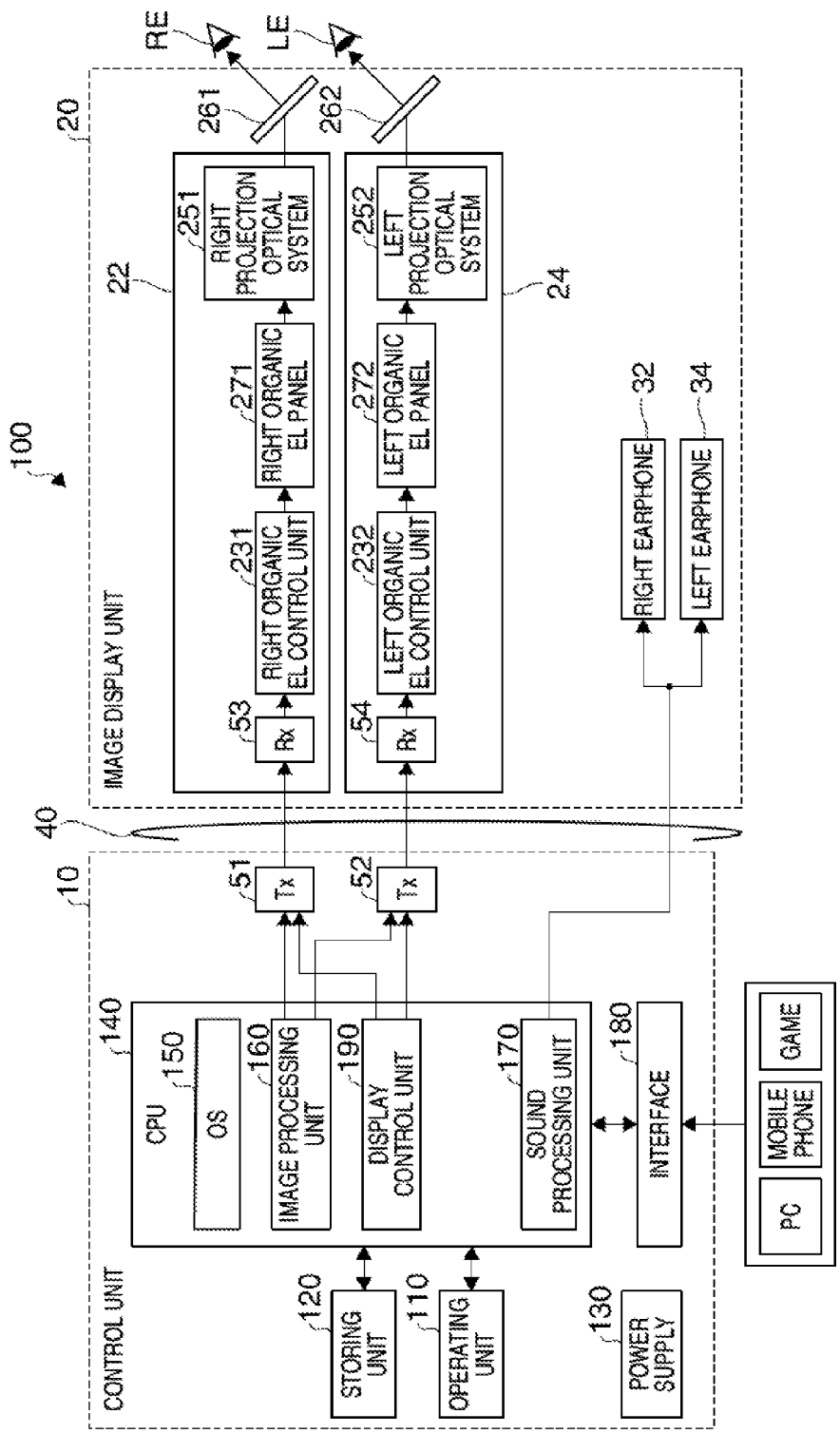
FIG. 12 is a functional block diagram functionally showing the configuration of a head-mounted display device according to a second embodiment.

FIG. 12 is a functional block diagram functionally showing the configuration of a head-mounted display device according to a second embodiment. In FIG. 12, the same configurations as those shown in FIG. 2 are denoted by the same reference numerals and signs, and the descriptions thereof are appropriately omitted.

In the second embodiment, as shown in FIG. 12, an organic EL panel (an example of a self light emitting element) is used as a display panel instead of a liquid crystal panel. A right organic EL panel 271 and a left organic EL panel 272 are each an organic EL panel in which a plurality of pixels formed of light emitting elements using an organic substance are arranged in a matrix. Since the organic EL panel has the light emitting elements, the right backlight control unit 201, the left backlight control unit 202, the right backlight 221, and the left backlight 222 are not necessary in the second embodiment. Other configurations are similar to those of the first embodiment.

Aright organic EL control unit 231 and a left organic EL control unit 232 drive, based on clock signals, synchronizing signals, and image data input via the receiving unit 53, the light emitting elements corresponding to the positions of the pixels of the right organic EL panel 271 and the left organic EL panel 272, whereby image light is generated in the right organic EL panel 271 and the left organic EL panel 272.

Similarly in the second embodiment, when the image processing unit 160 generates an image where pixels in a partial area are black pixels, the virtual image VI is displayed in a partial area of the virtual image display area AI as shown in FIG. 8B for example. Here, since a voltage for light emission is not applied to the light emitting elements in the area where the pixels are black pixels on the right organic EL panel 271 and the left organic EL panel 272, the power consumption can be effectively reduced without performing the control of adjusting the luminance or irradiation range of the backlight, unlike the first embodiment.

The invention is not limited to the embodiments described above but can be variously modified. For example, the invention includes a configuration (for example, a configuration having the same function, method, and result, or a configuration having the same advantage and effect) that is substantially the same as those described in the embodiments. Moreover, the invention includes a configuration in which a non-essential portion of the configurations described in the embodiments is replaced. Moreover, the invention includes a configuration providing the same operational effects as those described in the embodiments, or a configuration capable of achieving the same advantages. Moreover, the invention includes a configuration in which a publicly known technique is added to the configurations described in the embodiments.

For example, in the embodiment, a case has been described in which the control unit 10 and the image display unit 20 are separately configured. However, the control unit 10 and the image display unit 20 may be integrated to constitute the head-mounted display device 100.

Figure 13:
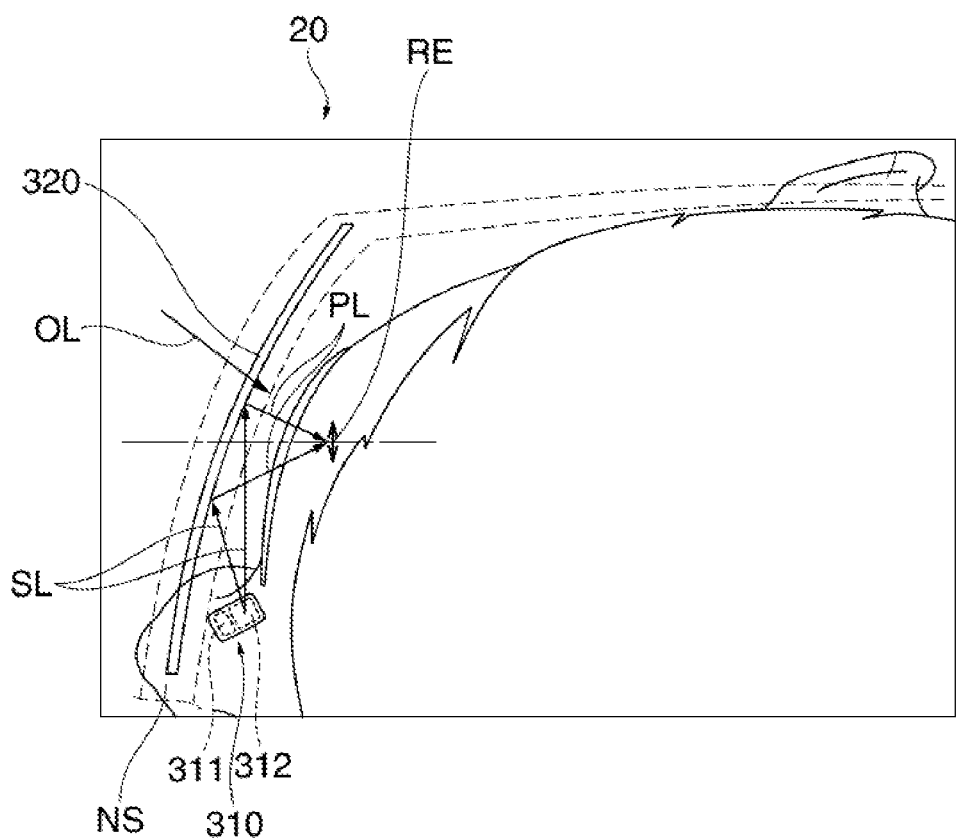
FIG. 13 explains a modified example.

Moreover, in the embodiment, a case has been described in which the image light generating unit includes a liquid crystal panel and a backlight and image light generated is guided to the eye of the user with the light guide unit. However, the invention is not limited to this. For example, as shown in FIG. 13, the image light generating unit (the image display unit 20) may include a light emitting unit 310 that forms signal light and emits the signal light as scanning light SL and a virtual image forming unit 320 that is an irradiated member receiving the scanning light SL to form image light PL. As shown in FIG. 13, the light emitting unit 310 is arranged around a nose NS of the user, while the virtual image forming unit 320 is arranged so as to cover the front of the eye RE of the user. The light emitting unit 310 has a signal light modulating unit 311 that forms signal light modulated according to an image, a scanning optical system 312 that two-dimensionally scans the signal light as the scanning light SL in the virtual image forming unit 320, and a drive control circuit (not shown). The signal light modulating unit 311 includes, for example, three light sources that generate respective red, blue, and yellow color lights and a dichroic mirror that combines the respective color lights to form signal light. The scanning optical system 312 includes, for example, an MEMS mirror. The virtual image forming unit 320 is a half mirror that is configured to have a semi-transmissive reflecting layer on a transparent substrate. The virtual image forming unit 320 receives the scanning light SL irradiated from the scanning optical system 312 and reflects the scanning light SL to form a virtual image, thereby allowing the user to visually recognize the virtual image. The virtual image forming unit 320 is configured such that the virtual image forming unit 320 not only forms a virtual image but also transmits outside world light OL to thereby make it possible for the user to visually recognize the virtual image and an outside world image simultaneously.

Moreover, the image light generating unit (the image display unit 20) may include a prism (light guide prism) including three or more non-axisymmetric curved surfaces and a projection lens that allows image light to be incident on the prism, and an optical system including the projection lens may be configured as a relay system that forms an intermediate image in the inside of the prism. Then, image light may be reflected by a third surface, a first surface, and a second surface of the prism, in this order, and then transmit through the first surface to reach the user, while outside world light may transmit through the first and third surfaces of the prism to reach the user.

Moreover, in the embodiment, a case has been described in which the third reflecting surface 321c of the light incident portion B1 includes a reflection mirror and the fourth reflecting surface 321d of the light exiting portion B3 includes a half mirror. However, a reflective volume hologram may be disposed in each of the light incident portion B1 and the light exiting portion B3 to cause diffractive reflection of image light.

The entire disclosure of Japanese Patent Application No. 2012-068767, filed Mar. 26, 2012 is expressly incorporated by reference herein.

What is claimed is:

1. A head-mounted display device that allows a user to visually recognize a virtual image in a state where the head-mounted display device is mounted on the head of the user, comprising:
    an image processing unit that performs a process of generating an image; and
    an image display unit having an image light generating unit that generates image light representing the image, and configured such that the user is allowed to visually recognize the virtual image and the outside world,
    wherein
        the head-mounted display device is configured such that, in a partial area of an area where the virtual image can be displayed in a visual field of the user, the outside world is allowed to be visually recognized preferentially, and
        the image processing unit generates an image where pixels in an area corresponding to the partial area are black pixels when the outside world is allowed to be visually recognized preferentially in the partial area.

2. The head-mounted display device according to claim 1, wherein
    the virtual image is allowed to be visually recognized at an edge portion of the area where the virtual image can be displayed, and the outside world is allowed to be visually recognized preferentially in the area other than the edge portion.

3. The head-mounted display device according to claim 1, wherein
    the image light generating unit includes a self light emitting element.

4. The head-mounted display device according to claim 1, wherein
    the image light generating unit modulates light irradiated from a light source into image light representing the image,
    the head-mounted display device further includes a light source control unit that controls the light source, and
    the light source control unit performs control of adjusting at least one of the luminance and irradiation range of the light source when the image where the pixels in the area corresponding to the partial area are black pixels is generated.

5. The head-mounted display device according to claim 1, wherein the image display unit further has a light guide member that guides the image light to the eye of the user, the light guide member has a light guide portion, a light incident portion that allows the image light to be incident on the light guide portion, and a light exiting portion that allows the image light guided by the light guide portion to exit to the outside, the light guide portion has a first reflecting surface and a second reflecting surface that are arranged in parallel with each other and enable guiding of light through total reflection, the light incident portion has a third reflecting surface at a predetermined angle with respect to the first reflecting surface, the light exiting portion has a fourth reflecting surface at a predetermined angle with respect to the first reflecting surface, image light from the image light generating unit is guided into the light guide member through a different number of times of reflection, and a plurality of image lights formed according to the number of times of reflection are combined via the light exiting portion to exit to the outside.

6. The head-mounted display device according to claim 1, wherein the image light generating unit has a scanning optical system that scans signal light modulated according to the image to thereby allow the signal light to exit as scanning light, and a virtual image forming unit that receives irradiation of the scanning light from the scanning optical system to form a virtual image.

7. The head-mounted display device according to claim 1, further comprising:

a plurality of image light generating units that each generate light for one of a plurality of areas of the image, each of the plurality of image light generating units generating light for a different area of the image, wherein, the image processing unit performs control of allowing each of the plurality of image light generating units corresponding to an area other than the partial area to generate light, and not allowing each of the plurality of image light generating units corresponding to areas covering the partial area to generate light such that pixels in an area corresponding to the partial area are black pixels when the outside world is allowed to be visually recognized preferentially in the partial area.

8. A head-mounted display device that allows a user to visually recognize a virtual image in a state where the head-mounted display device is mounted on the head of the user, comprising:

an image processing unit that performs a process of generating an image; and an image display unit having an image light generating unit that generates image light representing the image, and configured to allow the user to visually recognize the virtual image and, at the same time, visually recognize directly the outside world, wherein the head-mounted display device is configured such that in a partial area of an area where the virtual image can be displayed in a visual field of the user, the outside world is allowed to be visually recognized preferentially, and the image processing unit generates an image where pixels in an area corresponding to the partial area are black pixels and pixels in an area corresponding to an area other than the partial area form characters on a white background when the outside world is allowed to be visually recognized preferentially in the partial area.

* * * * *